United States Patent
Lee et al.

(10) Patent No.: US 8,004,822 B2
(45) Date of Patent: *Aug. 23, 2011

(54) MULTI-LAYER CERAMIC CAPACITOR AND PRODUCTION METHOD THEREOF

(75) Inventors: Kwi-Jong Lee, Seoul (KR); Young-Soo Oh, Seongnam-si (KR); Jin-Yong Kim, Seongnam-si (KR)

(73) Assignee: SAMSUNG Electro-Mechanics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/542,116

(22) Filed: Aug. 17, 2009

(65) Prior Publication Data

US 2010/0002359 A1 Jan. 7, 2010

Related U.S. Application Data

(62) Division of application No. 11/330,302, filed on Jan. 12, 2006, now Pat. No. 7,593,215.

(30) Foreign Application Priority Data

Mar. 24, 2005 (KR) .................................. 2005-24326

(51) Int. Cl.
*H01G 4/06* (2006.01)
(52) U.S. Cl. ............... 361/321.2; 361/321.1; 361/306.1; 361/306.3; 361/311; 361/313
(58) Field of Classification Search ............... 361/321.1, 361/321.2, 311–313, 301.2, 301.4, 306.1, 361/306.3

See application file for complete search history.

(56) References Cited

U.S. PATENT DOCUMENTS

| | | | |
|---|---|---|---|
| 5,583,738 A * | 12/1996 | Kohno et al. | 361/312 |
| 6,606,237 B1 | 8/2003 | Naito et al. | |
| 6,700,772 B2 | 3/2004 | Raghavendra et al. | |
| 6,819,543 B2 | 11/2004 | Vieweg et al. | |
| 6,982,864 B1 | 1/2006 | Sridharan | |
| 7,521,807 B2 * | 4/2009 | Shizuno | 257/774 |
| 7,593,214 B2 * | 9/2009 | Lee | 361/301.4 |

FOREIGN PATENT DOCUMENTS

| | | |
|---|---|---|
| CN | 1342555 | 4/2002 |
| JP | 1995-235441 | 9/1995 |
| JP | 1997-134844 | 5/1997 |
| JP | 2002-100543 | 4/2002 |
| JP | 2002-170737 | 6/2002 |
| KR | 2001-53096 | 6/2001 |
| KR | 10-403120 | 10/2003 |

* cited by examiner

*Primary Examiner* — Nguyen T Ha
(74) *Attorney, Agent, or Firm* — Stanzione & Kim, LLP

(57) ABSTRACT

The present invention relates to a multi-layer ceramic capacitor printed simultaneously with internal electrode and external electrode by employing an inkjet printing. A method for manufacturing the multi-layer ceramic capacitor comprising first external electrode, dielectric, internal electrode and second external electrode prints simultaneously the first external electrode; the internal electrode which is connected with the first external electrode and formed at an invaginated portion of the dielectric invaginated to allow one side to be opened at one portion; and the second external electrode which is formed integrally with the internal electrode by employing an inkjet printing. According to the present invention, a method for manufacturing the multi-layer ceramic capacitor resolves contact problems by printing integrally the internal electrode and the external electrode and reduces the manufacturing process.

5 Claims, 6 Drawing Sheets

MULTI-LAYER CERAMIC CAPACITOR AND PRODUCTION METHOD THEREOF

CROSS-REFERENCE TO RELATED APPLICATIONS

This application is a divisional of prior application Ser. No. 11/330,302, filed Jan. 12, 2006 now U.S. Pat. No. 7,593,215, in the U.S. Patent and Trademark Office, now pending, which claims benefit under 35 U.S.C. §119(a) of Korean Patent Application No. 2005-24326, filed on Mar. 24, 2005 in the Korean Intellectual Property Office, the entire contents of which are incorporated herein by reference.

BACKGROUND OF THE INVENTION

1. Field of the Invention

The present invention relates to an electronic component, particularly a multi-layer ceramic capacitor and a manufacturing method thereof.

2. Description of the Related Art

Multi-layer ceramic capacitor (MLCC: Multi-Layer Ceramic Capacitor) is an electronic component of laminated capacitors with a number of layers and performs various functions such as blockage of DC signals, bypassing, resonant frequency, and the like. Needs for smaller and light-weight multi-layer ceramic capacitor are increasing with the development of handheld communication terminals. According to the conventional technology, a multi-layer ceramic capacitor has been prepared by printing an electrode paste on a green sheet via a printing method such as screen printing, flexo printing, and gravure printing, cutting after layering a plurality of the green sheets, firing at a high temperature, coating an external electrode, firing, and coating.

Since an internal electrode is printed on the sheet of the printed dielectric, when dielectric sheets are layered, it causes height difference due to difference in thickness of the internal electrode. Referring to FIG. 1, it shows an internal electrode 110 and a dielectric 120, which form height difference a due to difference in thickness of the internal electrode. In order to reduce the height difference is it proposed to reduce the thickness of the internal electrode but it is limited to reduce it.

As described above, a process for manufacturing the multi-layer ceramic capacitor comprises molding, printing, layering, compressing, cutting, polishing, and processing of external electrodes. Thus, when connection between dielectric sheets is poor, it causes delamination. In addition, when the internal electrode and the external electrode are produced individually, it causes contact problem between the internal electrode and the external electrode.

SUMMARY OF THE INVENTION

It is therefore an object of the present invention to provide a multi-layer ceramic capacitor, which resolve height difference by printing simultaneously the internal electrode and the external electrode, and manufacturing method thereof.

It is further object of the present invention to provide a multi-layer ceramic capacitor to improve adhesion between dielectric sheets during layering and manufacturing method thereof.

It is still further object of the present invention to provide a multi-layer ceramic capacitor, which resolve contact problem by printing integrally the internal electrode and the external electrode, and manufacturing method thereof.

It is still further object of the present invention to provide a multi-layer ceramic capacitor, which reduces a manufacturing process by printing simultaneously the internal electrode and the external electrode, and manufacturing method thereof.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
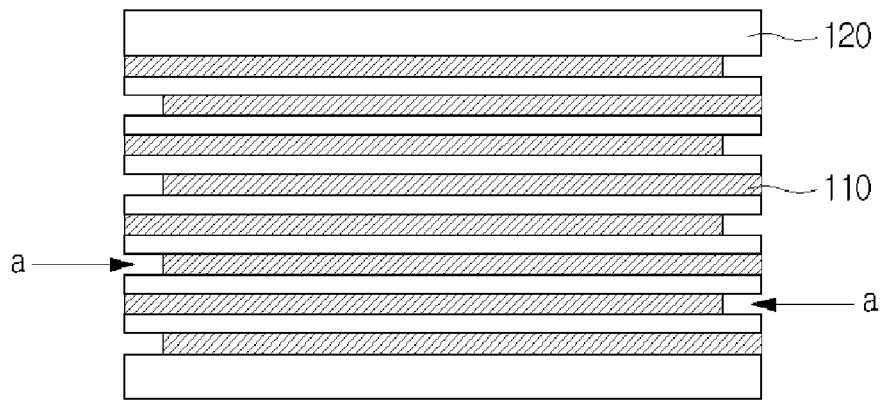
FIG. 1 illustrates difference in height produced by internal electrodes of a conventional multi-layer ceramic capacitor.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Here, the inkjet printing may be a method to spray ink for the electrode according to a predetermined pattern by employing an inkjet print head.

Further, the internal electrode, the first external electrode, and the second electrode may be printed simultaneously along with the dielectric by an inkjet printing. The inkjet printing may be a method to spray ink for the electrode and ink for the dielectric according to a predetermined pattern by employing a plurality of inkjet print heads.

Here, a plurality of inkjet print heads may comprise an inkjet print head for the electrode spraying ink for the electrode and an inkjet print head for the dielectric spraying ink for the dielectric. The inkjet print head for the electrode and the inkjet print head for the dielectric can spray ink by moving integrally or by moving independently according to its own operation signals.

According to another preferred embodiment of the present invention, it is provided a multi-layer ceramic capacitor prepared the method described above.

According to another preferred embodiment of the present invention, it is provided a device for manufacturing a multi-layer ceramic capacitor comprising an inkjet print head for the electrode spraying ink for the electrode, and an inkjet print head for the dielectric spraying ink for the dielectric, wherein the inkjet print head for the electrode and the inkjet print ink for the dielectric print simultaneously each internal electrode, external electrode, and dielectric.

Here, the inkjet print head for the electrode simultaneously prints the first external electrode, the internal electrode connected to the first external electrode and formed at an invaginated portion of the dielectric invaginated to allow one side to be opened at one portion, and the second external electrode integrally formed with the internal electrode by an inkjet printing.

In addition, the inkjet print head for the electrode and the inkjet print head for the dielectric may spray inks by moving integrally or by moving independently according to its own operation signals.

According to another preferred embodiment of the present invention, it is provided a method for manufacturing a multi-layer ceramic capacitor comprising: simultaneously printing the internal electrode, the external electrode, and the dielectric by spraying ink for the electrode and ink for the dielectric according to a predetermined pattern employing a plurality of inkjet print heads; layering and compressing the dielectric sheets printed with the internal electrode and the external electrode; cutting the dielectric sheets according to the predetermined pattern; and sintering the dielectric sheets.

Here, a cutting line to cut said dielectric sheets is parallel to the external electrode and divides the external electrode into two. The predetermined pattern is a pattern formed with alternating a line-shaped electrode and a comb-shaped electrode, wherein the line-shaped electrode is the first external electrode, a protrusion part of the comb-shaped electrode is the internal electrode and a body part of the comb-shaped electrode is the second external electrode.

A plurality of inkjet print heads may comprise an inkjet print head for the electrode spraying ink for the electrode and an inkjet print head for the dielectric spraying ink for the dielectric.

Here, the inkjet print head for the electrode and the inkjet print head for the dielectric may spray inks by moving integrally or by moving independently according to its own operation signals.

According to another preferred embodiment of the present invention, it is provided a method for manufacturing a multi-layer ceramic capacitor comprising: forming lower dielectric sheets simultaneously printed with internal electrode, external electrode, and dielectric by spraying ink for the electrode and ink for the dielectric according to a predetermined pattern employing a plurality of inkjet print heads; forming upper dielectric sheets with a predetermined number simultaneously printed with internal electrode, external electrode, and dielectric by spraying ink for the electrode and ink for the dielectric according to a predetermined pattern employing a plurality of inkjet print heads on the lower dielectric sheets; and sintering the lower dielectric sheets and the upper dielectric sheets with a predetermined number.

Here, a method may further comprise cutting the lower dielectric sheets and the upper dielectric sheets according to a predetermined pattern.

A plurality of inkjet print heads comprise an inkjet print head for the electrode spraying ink for the electrode and an inkjet print head for the dielectric spraying ink for the dielectric.

Here, the inkjet print head for the electrode and the inkjet print head for the dielectric may spray inks by moving integrally or by moving independently according to its own operation signals.

According to another preferred embodiment of the present invention, it is provided a multi-layer ceramic capacitor comprising a first external electrode, dielectric invaginated to allow one side to be opened at a portion and connected to the first external electrode, internal electrode formed at the invaginated portion of the dielectric, and a plurality of dielectric sheets printed with a second external electrode formed integrally with the internal electrode, wherein the dielectric sheets are layered symmetrically with the first external electrode and the second external electrode to connect electrically each other.

Here, the first external electrode, the dielectric, the internal electrode, and the second external electrode can be printed simultaneously by an inkjet printing and the inkjet printing is a method to spray ink for the electrode and ink for the dielectric according to a predetermined pattern by employing a plurality of inkjet print heads.

Further, the dielectric, the internal electrode, and the second external electrode may be formed with different materials from each other.

Hereinafter, embodiments of the multi-layer ceramic capacitor and manufacturing method thereof according to the present invention will be described in more detail with accompanying drawings, and in describing drawings, same or corresponding member will have same reference number and repeated description will be omitted throughout whole drawings. Further, the present invention can be generally applicable to multi-layer ceramic electronic components using layered ceramics and will describe general theory of the multi-layer ceramic capacitor prior to the detailed description of the preferred embodiments of the present invention.

A multi-layer ceramic capacitor comprises dielectric, internal electrode, and external electrode. The dielectric is an external body of the multi-layer ceramic capacitor and made from ceramic materials so that it is called as "ceramic body". Typical electric is $BaTiO_3$(Barium Titanate, BT) which has a high conductivity at an ambient temperature. A sinteration temperature of BT powder dielectric is about 1250° C.

The internal electrode is positioned in the dielectric and conductive materials. Example of the internal electrode includes palladium (Pd), nickel (Ni), copper (Cu), and the like of which each melting temperature is 1555° C., 1452° C., 1083° C., respectively. The external electrode is conductive material to connect the multi-layer ceramic capacitor with an external power. Since the external electrode is designed for a component for surface mount, it not only connects with an external power but also performs that solder adheres well thereto when it is mounted on the substrate.

Figure 2:
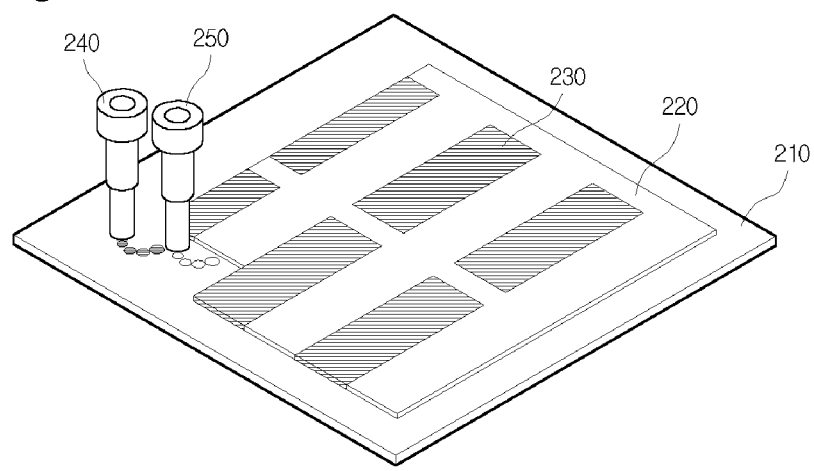
FIG. 2 illustrates a method for simultaneously printing a dielectric and an electrode by an inkjet printing according to a preferred embodiment of the present invention.

FIG. 2 illustrates a method for simultaneously printing a dielectric and an electrode by an inkjet printing according to a preferred embodiment of the present invention. Referring to FIG. 2, each inkjet print head for the electrode 240 and inkjet print head for the dielectric 250 form electrodes 230 and dielectrics 220 on a carrier film 210 according to a predetermined pattern.

The inkjet print head for the electrode 240 and the inkjet print head for the dielectric 250 spray ink for the electrode and ink for the dielectric, respectively. The ink for the electrode may comprise metal powder such as palladium (Pd), nickel (Ni), copper (Cu), tungsten (W), molybdenum (Mo), and the like, binder and solvent and the ink for the dielectric may comprise BT powder, binder, and solvent. Here, the ink for the electrode and the ink for the dielectric may use different solvents which are not miscible so that when they are printed simultaneously, they are not miscible.

Here, the term simultaneous printing of the electrode and the dielectric by an inkjet printing means not only spraying ink for the electrode and ink for the dielectric at the same time but also printing the electrode and the dielectric according to a predetermined program and pattern by employing a plurality of inkjet print heads. Thus, the electrode and the dielectric can be printed simultaneously or with the same pass. For example, referring to FIG. 2, the inkjet print head for the electrode 240 and the inkjet print head for the dielectric 250 move integrally on the carrier film 210 to simultaneously print the internal electrode and the dielectric. Here, the inkjet print head for the electrode 240 stops moving and the inkjet print head for the dielectric 250 only sprays ink for the dielectric at the portion where only dielectric is printed. Further, simultaneous printing of the electrode and the dielectric means printing at the same pass.

Such inkjet print head for the electrode 240 and inkjet print head for the dielectric 250 may be a head of inkjet print device to spray inks. For example, the inkjet print device may comprise a supporting part to support the device, an inkjet print head printing internal electrode and dielectric by spraying inks on a carrier film according to a predetermined pattern, a moving means moving the inkjet print head on the carrier film 210, and a circuit part performing program which is for the inkjet print head to spray inks according to a predetermined pattern.

Here, the inkjet print head for the electrode 240 and the inkjet print head for the dielectric 250 can spray by moving integrally. That is, the electrode and the dielectric are printed at the same pass according to a predetermined pattern. When the head moves at the same time, the electrode and the dielectric can be printed according to a predetermined pattern with controlling spraying time and amount from each head. According to another embodiment of the invention, the inkjet print head for the electrode 240 and the inkjet print head for the dielectric 250 can spray by moving independently according to its own operation signals. That is, each head has one device or a separate device so that it receives a different signal by a different program and operates corresponding to the signal.

Here, an electrode 230 is an electrode formed with the internal electrode and the external electrode integrally. That is, a portion to be used for the internal electrode and a portion to be used for the external electrode are distinguished according to a predetermined pattern on the electrode 230. The pattern distinguishing the internal electrode and the external electrode will be described in detail hereinafter.

Figure 3:
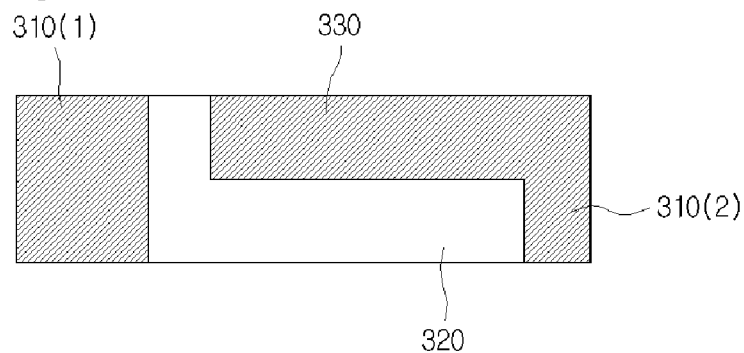
FIG. 3 is a cross sectional view of a pattern of the dielectric and the electrode simultaneously printed by an inkjet printing according to a preferred embodiment of the present invention.
Figure 4:
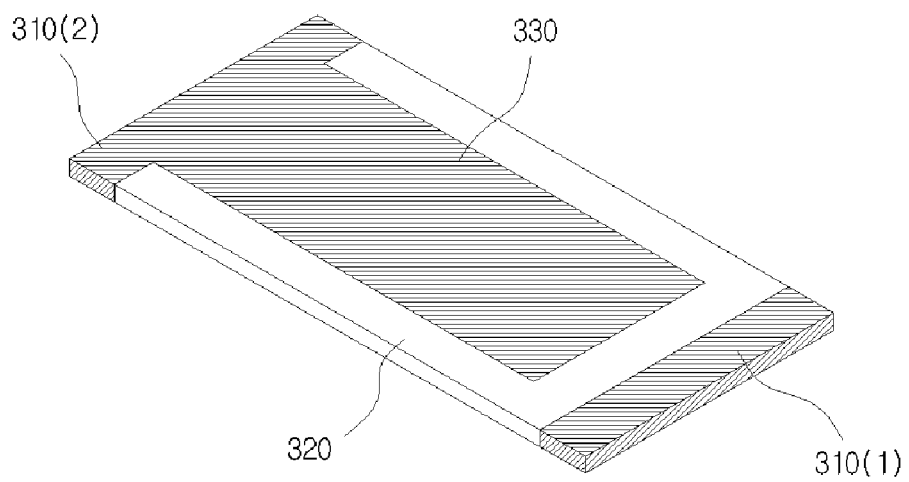
FIG. 4 is a side view of a pattern of the dielectric and the electrode simultaneously printed by an inkjet printing according to a preferred embodiment of the present invention.
Figure 5:
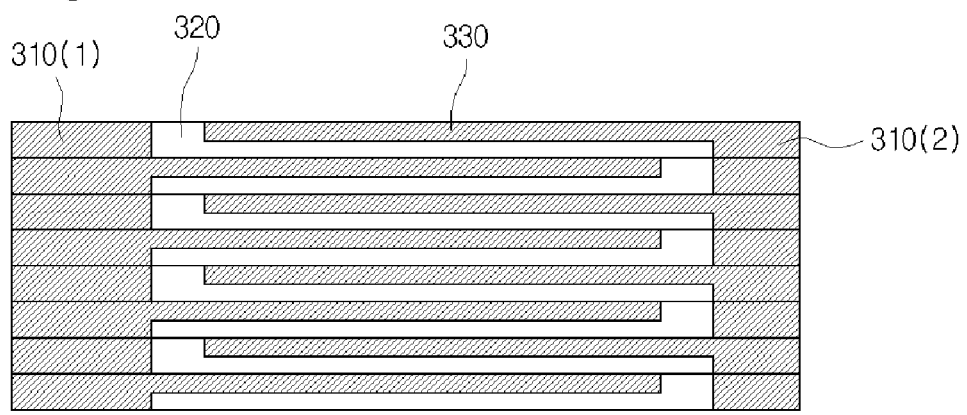
FIG. 5 is a cross sectional view of a multi-layer ceramic capacitor layered with the dielectric and the electrode simultaneously printed by an inkjet printing according to a preferred embodiment of the present invention.

FIG. 3 is a cross sectional view of a pattern of the dielectric and the electrode simultaneously printed by an inkjet printing according to a preferred embodiment of the present invention and FIG. 4 is a side view thereof. FIG. 5 is a cross sectional view of a multi-layer ceramic capacitor layered with the dielectric, the internal electrode and the external electrode simultaneously printed by an inkjet printing according to a preferred embodiment of the present invention.

Referring FIGS. 3 to 5, the external electrode 310(1), 310(2), the dielectric 320 and the internal electrode 330 are illustrated. Since the internal electrode 330 and the external electrode 310(2) are formed integrally, it resolves contact problem associated with the conventional technologies. Here, the internal electrode 330 and the external electrode 310(1), 310(2) can be formed with the same types of metal or different from each other according to the program of the inkjet printing. When the internal electrode 330 and the external electrode 310(1), 310(2) are formed from different metal from each other, the inkjet print head 240 may be performed in two ways. Alternatively, one inkjet print head for the electrode moves according to a predetermined pattern and sprays ink for the internal electrode at the internal electrode portion and ink for the external electrode at the external electrode portion. According to the other method, the inkjet print head of the electrode 240 comprises an inkjet print head for the internal electrode and an inkjet print head for the external electrode which spray ink for the internal electrode and ink for the external electrode to print the internal electrode and external electrode, respectively.

Here, when dielectric sheets simultaneously printed with the electrode and the dielectric are layered to be cross-over by 180° C. and symmetrical about the transverse direction, the multi-layer ceramic capacitor is formed. That is, the dielectric sheet is rotated about a center of the dielectric as a rotational axis and the external electrode 310(1) of the lower dielectric sheet and the external electrode 310(2) of the upper dielectric sheet are layered to be overlapped with a predetermined number and thus, the multi-layer ceramic capacitor is formed. At one end, the external electrode 310(1) of the lower dielectric sheet and the external electrode 310(2) of the upper dielectric sheet are electrically connected each other which form a part of the first whole external electrode of the multi-layer ceramic capacitor and at the other end, the external electrode 310(2) of the lower dielectric sheet and the external electrode 310(1) of the upper dielectric sheet are electrically connected each other which form a port of the second whole external electrode of the multi-layer ceramic capacitor. The first whole external electrode and the second whole external electrode are insulated from each other to form both ends of the multi-layer ceramic capacitor.

Therefore, the external electrode 310(1) of the lower dielectric sheet and, the external electrode 310(2) of the upper dielectric sheet are overlapped each other so that it doesn't cause contact problem between the internal electrode and the external electrode. The dielectric is invaginated to allow one side to be opened at one portion and is connected with the external electrode 310(1) at the unopened side and is connected with the external electrode 310(2) at the opened side. In addition, the dielectric of the lower dielectric sheet and the dielectric of the upper dielectric sheet are contacted each other and act as a dielectric between layers of the multi-layer ceramic capacitor. When the dielectric is invaginated more than half toward the transverse direction and the dielectric sheets are layered symmetrically about the transverse direction, the internal electrodes 330 formed at the invaginated portion are overlapped of a certain part with dielectrics therebetween. Thus, overlapped portion of the internal electrode (330) acts as an electrode in the multi-layer ceramic capacitor.

Figures illustrating the multi-layer ceramic capacitor and its manufacturing method have been described above. Hereinafter the multi-layer ceramic capacitor and its manufacturing method will be described in more detail based on particular embodiments of the invention. The embodiments of the present invention are divided into two of which one is a method for forming dielectric sheet on a carrier film by an inkjet printing and then laminating the formed dielectric sheets and the other is a method for forming dielectric sheet by an inkjet printing and then forming dielectric sheets on the formed dielectric sheet repeatedly by an inkjet printing.

Figure 6:
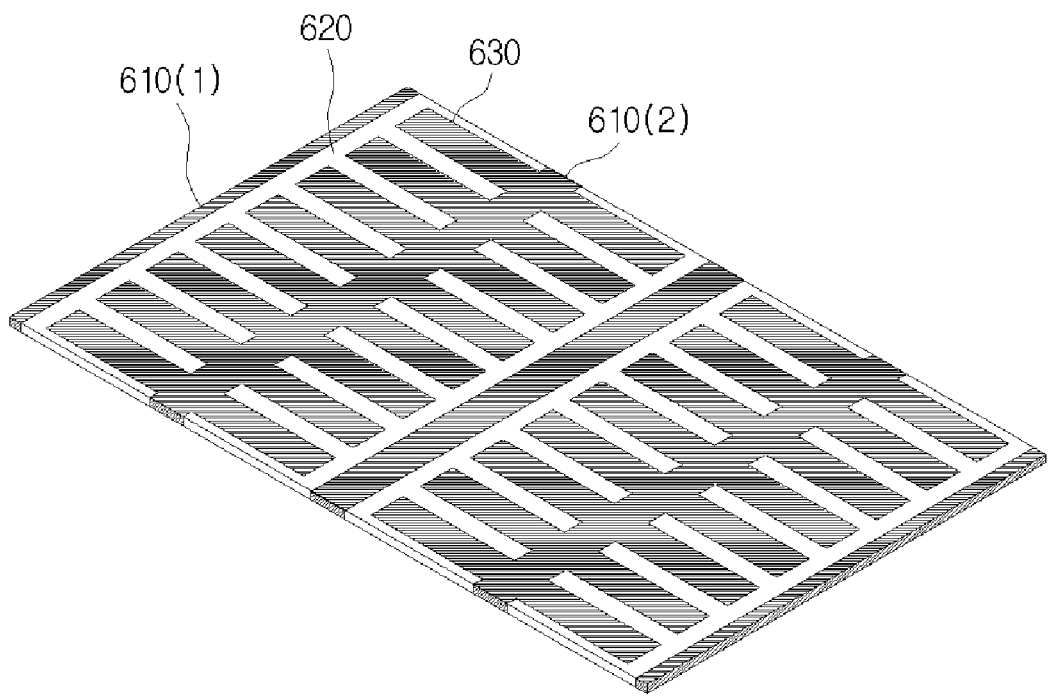
FIG. 6 is a side view of a pattern of the dielectric and the electrode simultaneously printed by an inkjet printing according to the first embodiment of the present invention.
Figure 7:
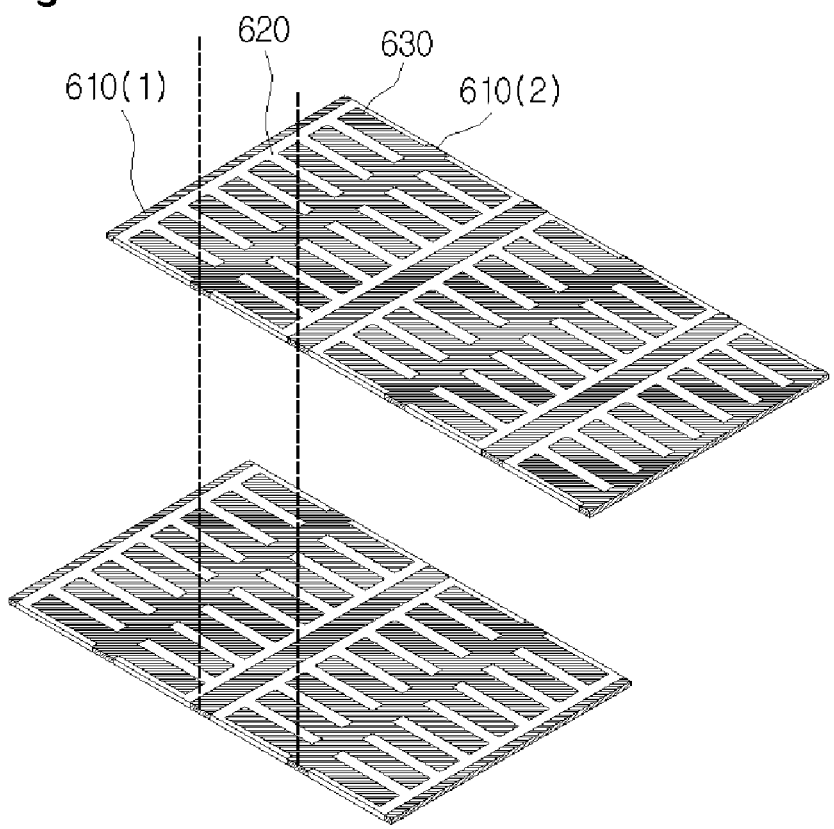
FIG. 7 illustrates a method for layering the dielectric and the electrode simultaneously printed by an inkjet printing according to the first embodiment of the present invention.

FIG. 6 is a side view of a comb-shaped pattern of the dielectric and the electrode simultaneously printed by an inkjet printing according to the first embodiment of the present invention and FIG. 7 illustrates a contact point when the dielectric and the electrode simultaneously printed by an inkjet printing according to the first embodiment of the present invention are laminated.

Referring FIGS. 6 and 7, a protrusion part of the comb-shaped electrode is an internal electrode 630, a body part of the comb-shaped electrode is an external electrode 610(2), and the line-shaped electrode formed between the comb-shaped electrodes is another external electrode 610(1). The external electrode 610(2) of the upper dielectric sheet and the external electrode 610(1) of the lower dielectric sheet are overlapped to laminate dielectric sheets with a predetermined number. It is cut according to a pattern to provide a multi-layer ceramic capacitor, wherein the internal electrodes are laminated alternatively. A cutting line to cut the dielectric sheet is parallel to each external electrode 610(1), 610(2) and divides the external electrode 610(1), 610(2) in two.

Figure 8:
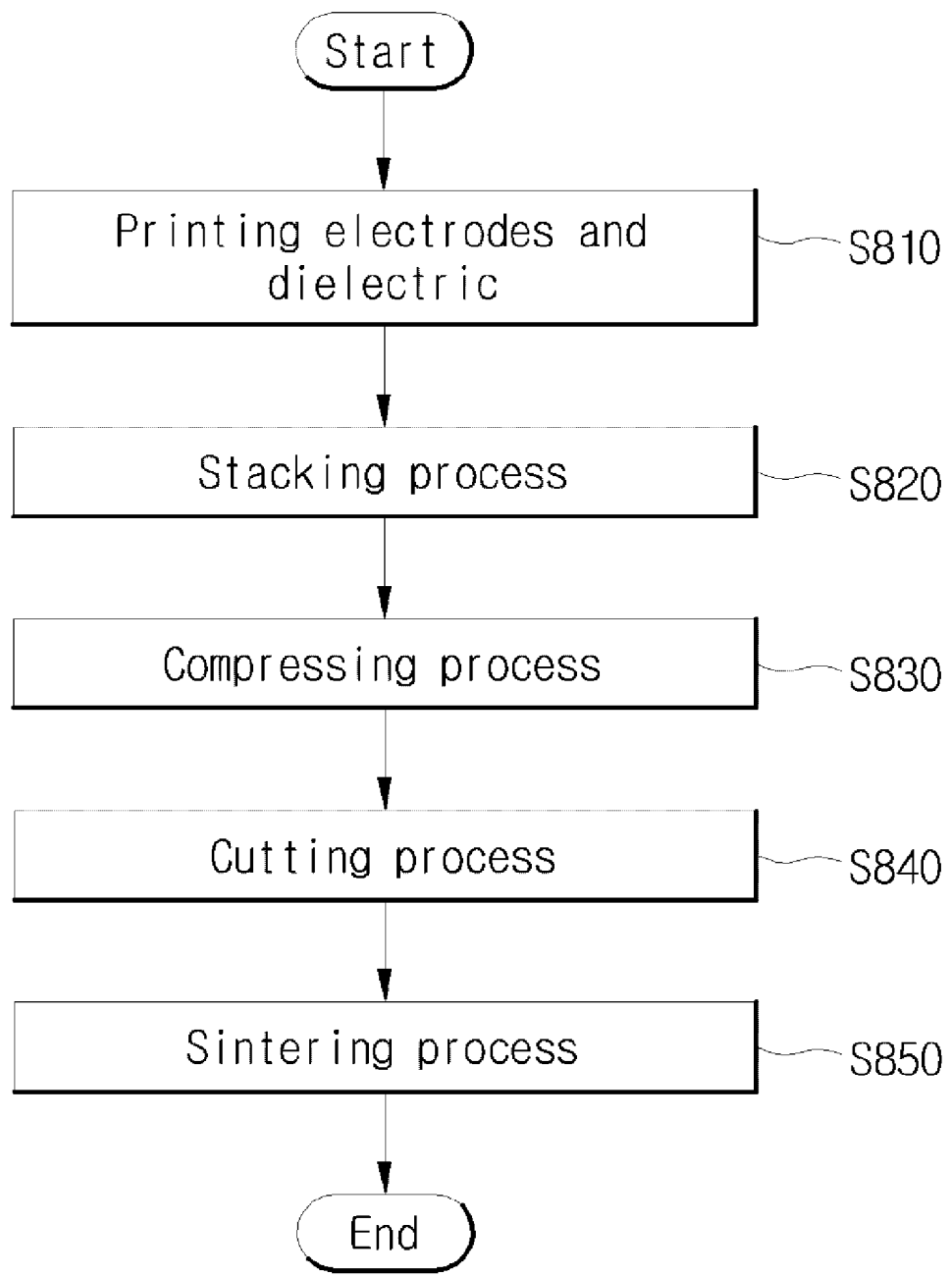
FIG. 8 is a flow chart illustrating a process for forming a multi-layer ceramic capacitor by utilizing the dielectric and the electrode simultaneously printed by an inkjet printing according to the first embodiment of the present invention.

FIG. 8 is a flow chart illustrating a process for forming a multi-layer ceramic capacitor by utilizing the dielectric and the electrode simultaneously printed by an inkjet printing according to the first embodiment of the present invention.

At S810, the external electrode 610(1), 610(2), the dielectric 620 and the internal electrode 630 are printed according to a predetermined pattern by employing the inkjet print head for the electrode 240 and the inkjet print head for the dielectric 250.

At S820, the dielectric sheets printed with the external electrode 610(1), 610(2), the dielectric 620 and the internal electrode 630 are layered with a predetermined number and at S830, the layered dielectric sheets are compressed and further cut into a chip unit at S840. At S850, the chip is sintered and coated to produce the desired multi-layer ceramic capacitor with chip unit. Therefore, the present invention provides advantages of that a process for forming the external electrode can be omitted and the process of laminating, compressing and cutting of the conventional technologies can be utilized at its maximum.

Figure 9:
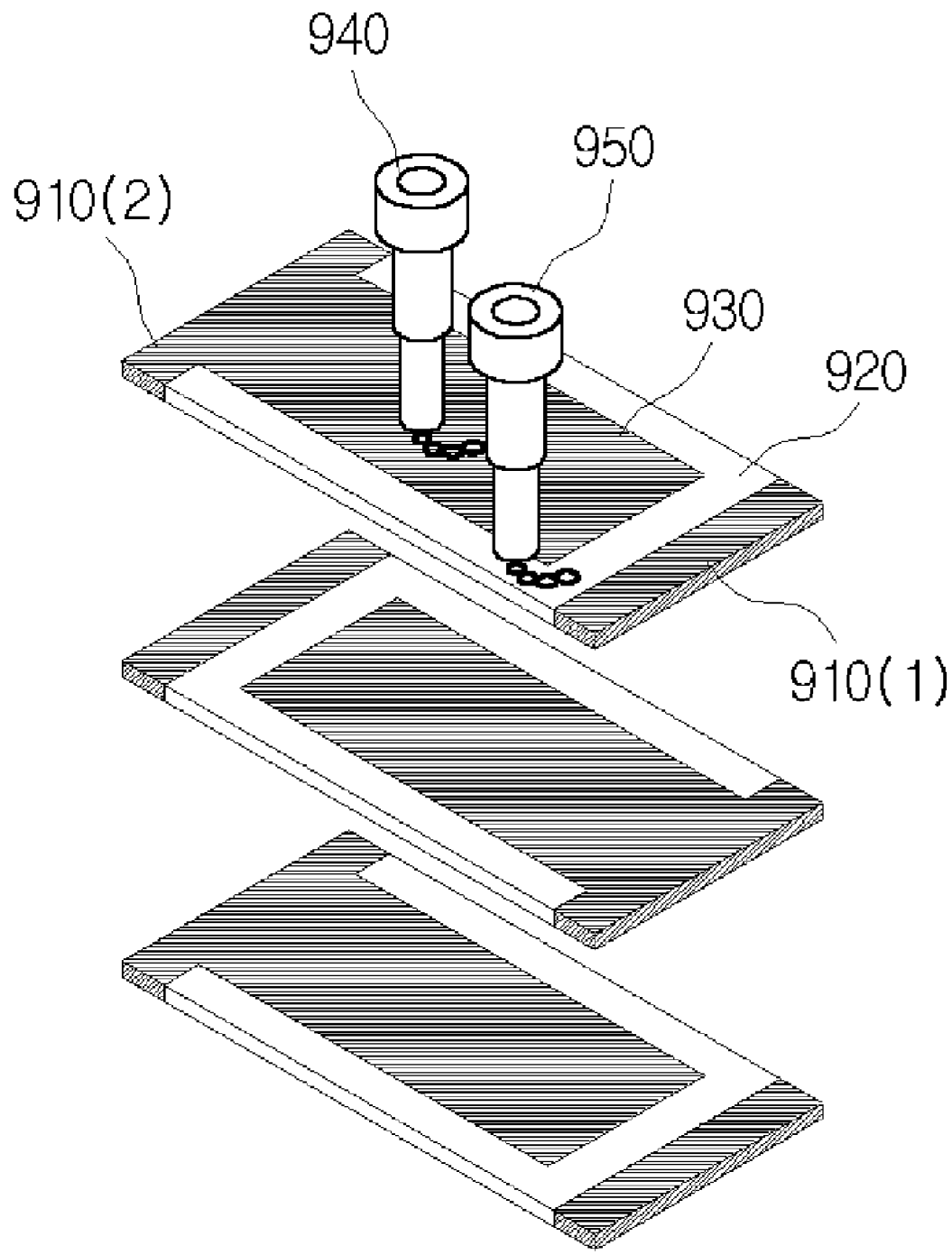
FIG. 9 illustrates a method for layering the dielectric and the electrode simultaneously printed by an inkjet printing according to the second embodiment of the present invention.

FIG. 9 illustrates a method for layering the dielectric and the electrode, which are simultaneously printed by an inkjet printing, through a build-up method according to the second embodiment of the present invention. Referring to FIG. 9, the external electrode 910(1), 910(2), the dielectric 920 and the internal electrode 930 are printed by employing the inkjet print head for the electrode 940 and the inkjet print head for the dielectric 950. The dielectric sheet is laminated with a predetermined number and the pattern printed on the dielectric sheet is rotated by 180° C. one after another. Thus, the lower dielectric sheet and the upper dielectric sheet are contacted each other at the external electrode 910(1), 910(2).

Figure 10:
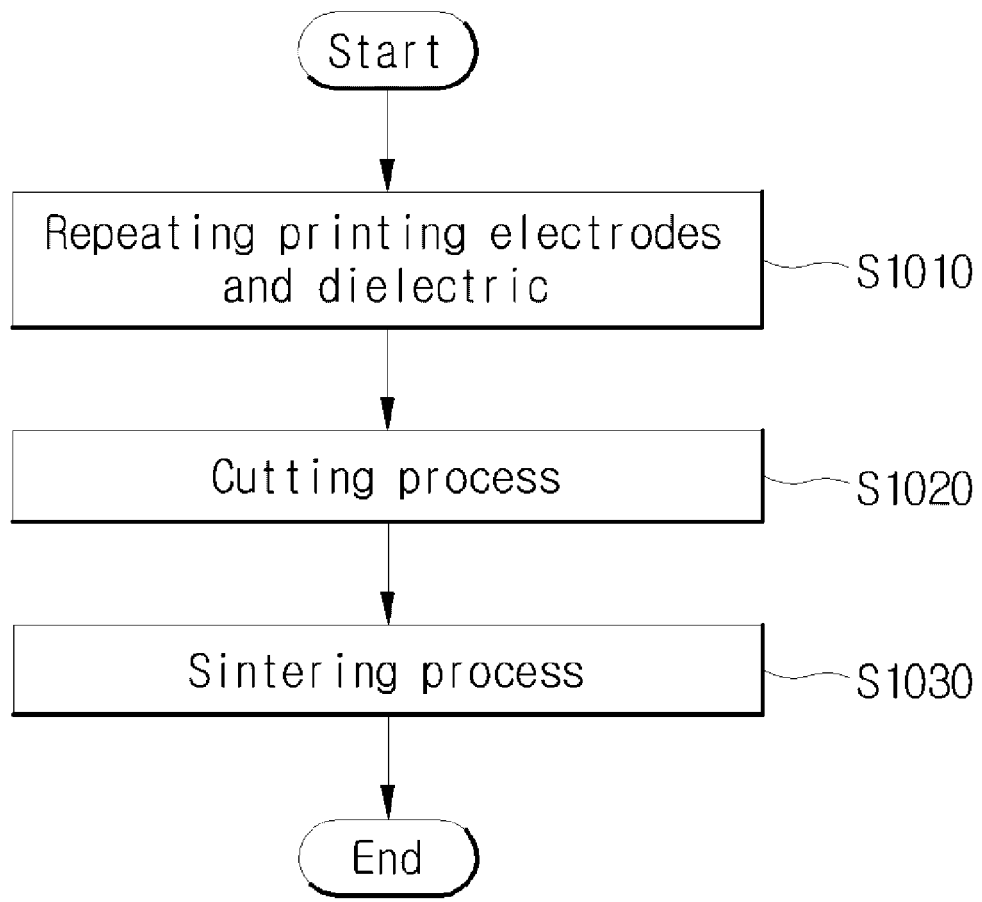
FIG. 10 is a flow chart illustrating a process for forming a multi-layer ceramic capacitor by utilizing the dielectric and the electrode simultaneously printed by an inkjet printing according to the second embodiment of the present invention.

FIG. 10 is a flow chart illustrating a process for forming a multi-layer ceramic capacitor by layering the dielectric and the electrode, which are simultaneously printed by an inkjet printing, through a build-up method according to the second embodiment of the present invention. The difference from the first embodiment is described in more detail.

At S1010, the external electrode 610(1), 610(2), the dielectric 620 and the internal electrode 630 are printed according to a predetermined pattern by employing the inkjet print head for the electrode 240 and the inkjet print head for the dielectric 250. This printing process is repeated on the printed dielectric sheet. Thus, unlike the first embodiment described above, the process for laminating the dielectric sheets is omitted.

At S1020, it is cut into a chip unit. Here, a process for cutting into a chip unit is inserted but if the dielectric sheet with a chip unit from the beginning is printed and laminated, this process can be also omitted. At S1030, the formed chip is sintered and coated to produce the desired multi-layer ceramic capacitor with a chip unit.

Therefore, according to this method, molding, printing, laminating, compressing, cutting, and forming processes of external electrodes can be obtained by only one process.

Although the foregoing description details various embodiments of the invention, it will be appreciated that the embodiments are only examples of realizing the spirit of the invention, and that any changed or modified examples remain within the scope of the invention so long as they do not depart from the spirit of the invention.

As described above, the multi-layer ceramic capacitor and manufacturing method thereof of the present invention resolves height difference by printing simultaneously the internal electrode and the external electrode.

Further, the multi-layer ceramic capacitor and manufacturing method thereof of the present invention provides improved adhesion between laminated dielectric sheets.

Still further, the multi-layer ceramic capacitor and manufacturing method thereof of the present invention resolves contact problem by printing integrally the internal electrode and the external electrode.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method for manufacturing a multi-layer ceramic capacitor comprising:
    forming dielectric sheets simultaneously printed with an internal electrode, at least one external electrode and a dielectric by spraying ink for the electrode and ink for the dielectric according to a predetermined pattern employing a plurality of inkjet print heads;
    layering and compressing the dielectric sheets;
    cutting the dielectric sheets according to the predetermined pattern; and
    sintering the dielectric sheets,
    wherein said predetermined pattern is a pattern formed with alternating a line-shaped electrode and a comb-shaped electrode, wherein the line-shaped electrode is a first external electrode, a protrusion part of the comb-shaped electrode is the internal electrode and a body part of the comb-shaped electrode is a second external electrode.

2. The method for manufacturing a multi-layer ceramic capacitor of claim 1, wherein a cutting line to cut said dielectric sheets is parallel to the external electrode and divides the external electrode into two.

3. The method for manufacturing a multi-layer ceramic capacitor of claim 1, wherein
    said plurality of inkjet print heads comprise an inkjet print head for the electrode spraying ink for the electrode and an inkjet print head for the dielectric spraying ink for the dielectric.

4. The method for manufacturing a multi-layer ceramic capacitor of claim 3, wherein
said inkjet print head for the electrode and said inkjet print head for the dielectric spray inks by moving integrally.

5. The method for manufacturing a multi-layer ceramic capacitor of claim 3, wherein
said inkjet print head for the electrode and said inkjet print head for the dielectric spray inks by moving independently according to its own operation signals.

* * * * *